(12) United States Patent
Kawashima et al.

(10) Patent No.: US 8,441,717 B2
(45) Date of Patent: May 14, 2013

(54) PLC-TYPE DELAY DEMODULATION CIRCUIT

(75) Inventors: Hiroshi Kawashima, Tokyo (JP); Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/336,111

(22) Filed: Dec. 23, 2011

(65) Prior Publication Data

US 2012/0162746 A1   Jun. 28, 2012

Related U.S. Application Data

(63) Continuation of application No. PCT/JP2011/057578, filed on Mar. 28, 2011.

(30) Foreign Application Priority Data

Mar. 30, 2010 (JP) .................................. 2010-077635

(51) Int. Cl.
*G02F 2/00* (2006.01)
*G02F 1/035* (2006.01)

(52) U.S. Cl.
USPC ............. 359/325; 385/8; 385/9; 385/14

(58) Field of Classification Search .................. 385/1–9, 385/14, 129–132; 359/237, 325; 398/205, 398/214; 375/324, 350
See application file for complete search history.

(56) References Cited

U.S. PATENT DOCUMENTS

| 5,943,452 | A | 8/1999 | Himeno et al. | |
| 6,961,492 | B2* | 11/2005 | Doerr | 385/39 |
| 7,259,901 | B2* | 8/2007 | Parsons et al. | 359/237 |
| 7,480,091 | B2* | 1/2009 | Hasegawa et al. | 359/325 |
| 7,899,279 | B2* | 3/2011 | Nasu et al. | 385/14 |
| 7,961,991 | B2* | 6/2011 | Hasegawa et al. | 385/14 |
| 7,978,401 | B2* | 7/2011 | Hasegawa et al. | 359/325 |

(Continued)

FOREIGN PATENT DOCUMENTS

| JP | 6-18735 A | 1/1994 |
| JP | 10-104446 | 4/1998 |

(Continued)

OTHER PUBLICATIONS

International Search Report mailed Jun. 21, 2011, in International Application No. PCT/JP2011/057578.

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

The PLC-type delay demodulation circuit includes a planar lightwave circuit that is provided on one PLC chip and demodulates a DQPSK signal. The planar lightwave circuit includes a Y-branch waveguide that branches a DQPSK-modulated optical signal into two optical signals and first and second MZIs that delay the branched optical signals by one bit. A wave plate is provided in central portions of first and second arm waveguides of the first MZI and first and second arm waveguides of the second MZI in such a manner that the wave plate intersects all of the four arm waveguides, the four arm waveguides being close to one another in a portion where the wave plate is provided.

15 Claims, 10 Drawing Sheets

U.S. PATENT DOCUMENTS

| | | |
|---|---|---|
| 2005/0141813 A1 | 6/2005 | Nakagawa |
| 2007/0177151 A1 | 8/2007 | Isomura et al. |
| 2008/0239465 A1 | 10/2008 | Hasegawa et al. |
| 2010/0046064 A1 | 2/2010 | Hasegawa et al. |
| 2010/0104237 A1 | 4/2010 | Nasu et al. |

FOREIGN PATENT DOCUMENTS

| | | |
|---|---|---|
| JP | 2000-162454 A | 6/2000 |
| JP | 2007-201939 A | 8/2007 |
| JP | 2007-232944 A | 9/2007 |
| JP | 2008-250304 A | 10/2008 |
| JP | 2009-244483 A | 10/2009 |
| WO | 2004/077117 A1 | 9/2004 |
| WO | 2008/084707 A1 | 7/2008 |

OTHER PUBLICATIONS

Hashimoto, Toshikazu, et al., "Compact DQPSK Demodulator with Interwoven Double Mach-Zehnder Interferometer using Planar Lightwave Circuit," ECOC Sep. 21-25, 2008, Mo.3.C.2.
U.S. Appl. No. 13/333,432, filed Dec. 21, 2011, Kawashima, et al.
U.S. Appl. No. 13/409,343, filed Mar. 1, 2012, Inoue, et al.
U.S. Appl. No. 13/409,556, filed Mar. 1, 2012, Inoue , et al.
U.S. Appl. No. 13/614,692, filed Sep. 13, 2012, Kawashima, et al.

* cited by examiner

PLC-TYPE DELAY DEMODULATION CIRCUIT

BACKGROUND OF THE INVENTION

1. Field of the Invention

The present invention relates to a PLC-type delay demodulation circuit including a planar lightwave circuit that is formed on one PLC chip and demodulates a DQPSK modulated optical signal.

2. Description of the Related Art

In a 40 Gbps DQPSK communication system, as a method of configuring a delay circuit that demodulates a DQPSK (Differential Quadrature Phase Shift Keying)-modulated signal (optical signal) in a PLC, a method has been proposed which configures the delay circuit including an optical splitter and two MZIs (for example, see Hashimoto, Toshikazu, et al., "Compact DQPSK Demodulator with Interwoven Double Mach-Zehnder Interferometer using Planar Lightwave Circuit," ECOC 2008 Proceeding, Mo.3.C.2). In the device, it is necessary to reduce the size of a module, power consumption, and polarization dependence and obtain uniform MZI characteristics.

Of these, particularly for the reduction of polarization dependence, regarding a delay circuit (optical signal processor) including a single MZI, it has been proposed that two arm waveguides that form the MZI are brought close to each other in a wave plate insertion portion so as to reduce the effect of the positional dependence of the polarization conversion efficiency of the wave plate, thereby reducing polarization dependence (for example, see Japanese Patent Application Laid-Open (JP-A) No. 2007-232944).

Similarly, the deterioration of polarization dependence due to the positional dependence of the polarization conversion efficiency of the wave plate also occurs in a delay circuit having two MZIs for DQPSK signal demodulation. Thus, for example, in the delay circuit for DQPSK described in Japanese Patent Application Laid-Open (JP-A) No. 2009-244483, as shown in FIG. 14, the following attempt has been made. In the portion where a wave plate 47 is inserted, first arm waveguides 8 and 12 and second arm waveguides 9 and 13 of two MZIs 4 and 5 are brought close to each other, respectively, so as to reduce the effect of the positional dependence of the polarization conversion efficiency of the wave plate 47 between the two arm waveguides for each of the MZIs 4 and 5, thereby reducing polarization dependence.

However, in the case where one wave plate 47 is inserted for the arm waveguides of the MZI 4 and MZI 5 and used as shown in FIG. 14, in addition to the positional dependence of the polarization conversion efficiency of the wave plate at the position where the wave plate intersects the two arm waveguides of each MZI, a problem may arise in the positional dependence of the polarization conversion efficiency of the wave plate 47 between the positions of the arm waveguides 8 and 9 of the MZI 4 and the positions of the arm waveguides 12 and 13 of the MZI 5. That is, for example, because of the positional dependence of the polarization conversion efficiency of the wave plate 47, although a portion with excellent polarization conversion efficiency can used for one MZI 4, a portion with poor polarization conversion efficiency is assigned to the other MZI 5, resulting in a problem in that it may be impossible to obtain excellent characteristics in both the MZIs 4 and 5 at the same time.

Further, a wave plate that is sized to intersect each of the arm waveguides of both the MZIs 4 and 5 is required, resulting in the problem of increased cost.

The problem of the positional dependence of the polarization conversion efficiency of the wave plate can be solved by using different wave plates for respective MZIs. However, in such a case, there are problems such as the cost for the wave plates or their insertion, an increase in size due to the space to be ensured for the insertion of the two wave plates, etc.

In light of these problems and requirements, the present invention proposes a novel layout for a PLC-type delay demodulation circuit. An object of the present invention is to provide a PLC-type delay demodulation circuit that is less susceptible to the positional dependence of the polarization conversion efficiency of a wave plate, facilitates the achievement of excellent characteristics in both MZIs at the same time, and enables cost reduction.

SUMMARY OF THE INVENTION

In order to achieve the object, according to an aspect of the invention, a PLC-type delay demodulation circuit comprises a planar lightwave circuit that is formed on one PLC chip and demodulates a DQPSK-modulated optical signal. The planar lightwave circuit includes an optical splitter that branches the DQPSK-modulated optical signal into two optical signals; and first and second Mach-Zehnder Interferometers (MZIs) that delay the branched optical signals by one bit so as to interfere with each other. A wave plate is provided in central portions of first and second arm waveguides of the first MZI and first and second arm waveguides of the second MZI in such a manner that the wave plate intersects all of the four arm waveguides. The four arm waveguides are close to one another in a portion where the wave plate is provided. According to this configuration, all of the four arm waveguides pass through only a narrow region of the wave plate. Accordingly, susceptibility to the positional dependence of the polarization conversion efficiency of the wave plate is reduced, and the achievement of excellent characteristics in both MZIs is facilitated. Further, cost can be reduced.

According to another aspect of the invention, in the planar lightwave circuit, the arm waveguides of the first MZI and second MZI are placed to overlap each other in the same region, the second arm waveguide of the first MZI and the first arm waveguide of the second MZI intersect each other at two points on both sides of the wave plate, and in the arrangement of the four arm waveguides in a portion where the wave plate is inserted, the first arm waveguide of the second MZI is placed between the two arm waveguides of the first MZI.

This configuration makes it possible to reduce the pitch between waveguides in the wave plate insertion portion with a minimum number of intersection portions, whereby low PDf characteristics can be obtained with low loss.

According to another aspect of the invention, in the planar lightwave circuit, the first MZI is placed in a region inside the second MZI, and the four arm waveguides in a portion where the wave plate is inserted are placed in the following order: the first arm waveguide of the first MZI, the second arm waveguide of the first MZI, the first arm waveguide of the second MZI, the second arm waveguide of the second MZI.

This configuration makes it possible to eliminate the intersection points between the two arm waveguides of the first MZI and the arm waveguide of the second MZI and reduce the pitch between waveguides in the wave plate insertion portion, whereby low PDf characteristics can be obtained with low loss. In particular, in the case where the optical path length difference ΔL between the arm waveguides of the first MZI and also between the arm waveguides of the second MZI is relatively small, it is easy to place the first MZI in the region inside the second MZI, and such a case is thus preferable.

According to another aspect of the invention, in the planar lightwave circuit, the arm waveguides of the first MZI and second MZI are placed to overlap each other in the same region, the second arm waveguide of the first MZI and the first arm waveguide of the second MZI intersect each other at two points on both sides of the wave plate, and the optical path length of the shorter arm waveguide of the first MZI is the same as the optical path length of the shorter arm waveguide of the second MZI. The optical path length from the optical splitter through the shorter arm waveguide of the first MZI to an output end of the first MZI is the same as the optical path length from the optical splitter through the shorter arm waveguide of the second MZI to an output end on the second MZI side.

In the arrangement of the four arm waveguides in a portion where the wave plate is inserted, the first arm waveguide of the second MZI is placed between the two arm waveguides of the first MZI.

This configuration makes it possible to reduce the pitch between waveguides in the wave plate insertion portion with a minimum number of intersection portions, whereby low PDf characteristics can be obtained with low loss.

According to another aspect of the invention, the optical path length L1 of the shorter arm waveguide of the first MZI is different from the optical path length L2 of the shorter arm waveguide of the second MZI, and the optical path length from the optical splitter through the shorter arm waveguide of the first MZI to an output end of the first MZI is equal to the optical path length from the optical splitter through the shorter arm waveguide of the second MZI to an output end on the second MZI side.

According to another aspect of the invention, the four arm waveguides in the portion where the wave plate is inserted are placed in the following order: the first arm waveguide of the first MZI, the first arm waveguide of the second MZI, the second arm waveguide of the first MZI, the second arm waveguide of the second MZI.

According to another aspect of the invention, the planar lightwave circuit includes two waveguides that are branched from the optical splitter and connected to input couplers of the first and second MZIs, respectively; first and second light output waveguides that extend from an output coupler of the first MZI to the output ends thereof; and third and fourth light output waveguides that extend from an output coupler of the second MZI to the output ends thereof. The optical path length L1 of the shorter arm waveguide of the first MZI is greater than the optical path length L2 of the shorter arm waveguide of the second MZI. The sum of the optical path lengths of one of the two waveguides and the third and fourth light output waveguides is L1-L2 greater than the sum of the optical path lengths of the other one of the two waveguides and the first and second light output waveguides.

According to another aspect of the invention, the one of the waveguides is L1-L2 longer than the other one of the waveguides, and the optical path lengths of the first and second light output waveguides and the optical path lengths of the third and fourth light output waveguides are all equal.

According to another aspect of the invention, the one of the waveguides and the other one of the waveguides are each a U-shaped waveguide including a curved waveguide. This configuration makes it possible to easily adjust the length in a narrow region.

According to another aspect of the invention, the one of the waveguides is placed to extend outside the other one of the waveguides.

According to another aspect of the invention, the planar lightwave circuit includes a light input waveguide to be connected to the optical splitter; and four light output waveguides to be connected to an output coupler of the first MZI and an output coupler of the second MZI, respectively. The light input waveguide and the four light output waveguides are all provided on the same end surface of the PLC chip. This configuration makes it possible to place all of the input port and the four output ports on the same end surface.

According to another aspect of the invention, in the central portions of the two arm waveguides of the first MZI and the central portions of the two arm waveguides of the second MZI, a first half-wave plate whose main axis is inclined at an angle of 45° with respect to a refractive index main axis of the arm waveguides is inserted as the wave plate. This configuration makes it possible to reduce the polarization deviation amount PDf.

According to another aspect of the invention, at a position that deviates from the central portions of the two arm waveguides of the first MZI to an output side and a position that deviates from the central portions of the two arm waveguides of the second MZI to the output side, a second half-wave plate whose main axis is parallel or horizontal to the refractive index main axis of the arm waveguides is inserted.

This configuration makes it possible to inhibit the deterioration of the polarization deviation amount PDf due to polarization conversion in a coupler.

According to another aspect of the invention, the input couplers and output couplers of the first and second MZIs are each a 3-dB coupler having two inputs and two outputs. The other one of the waveguides and the one of the waveguides are each connected to one of the two input ends of the respective input coupler on the same side.

This configuration makes it possible to use a balanced receiver made of the same photoreceptor pair for the two output ends of the first MZI and the two output ends of the second MZI.

According to the present invention, all of the four arm waveguides pass through only a narrow region of the wave plate. As a result, it is possible to achieve a PLC-type delay demodulation circuit that is less susceptible to the positional dependence of the polarization conversion efficiency of the wave plate, facilitates the achievement of excellent characteristics in both MZIs at the same time, and enables cost reduction.

DETAILED DESCRIPTION OF THE EXEMPLARY EMBODIMENTS

PLC-type delay demodulation circuits according to exemplary embodiments of the invention will be described with reference to the accompanying drawings.

Figure 14:
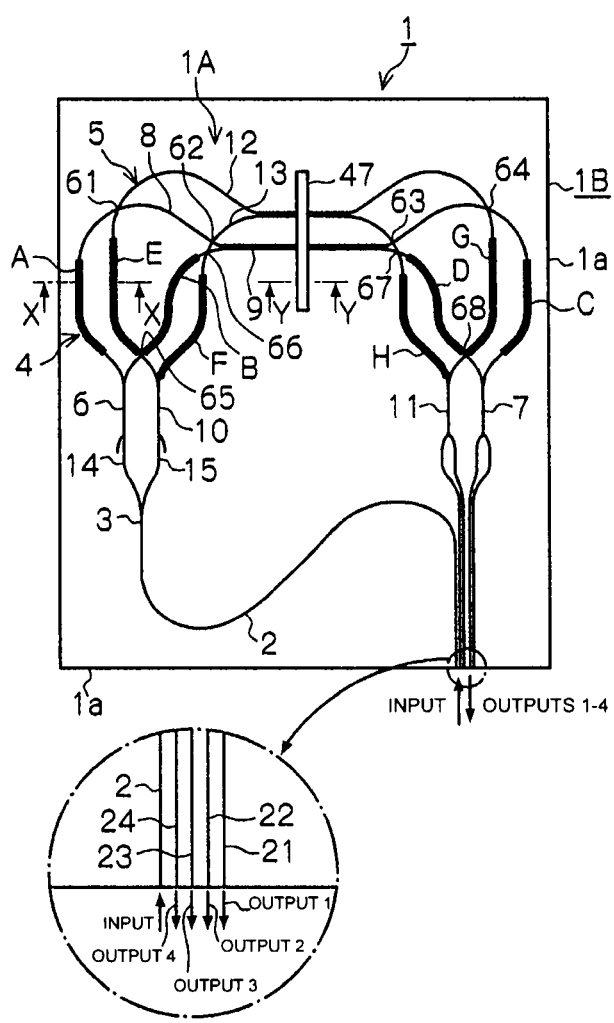
FIG. 14 is a plan view schematically illustrating the structure of the related art.
Figure 15:
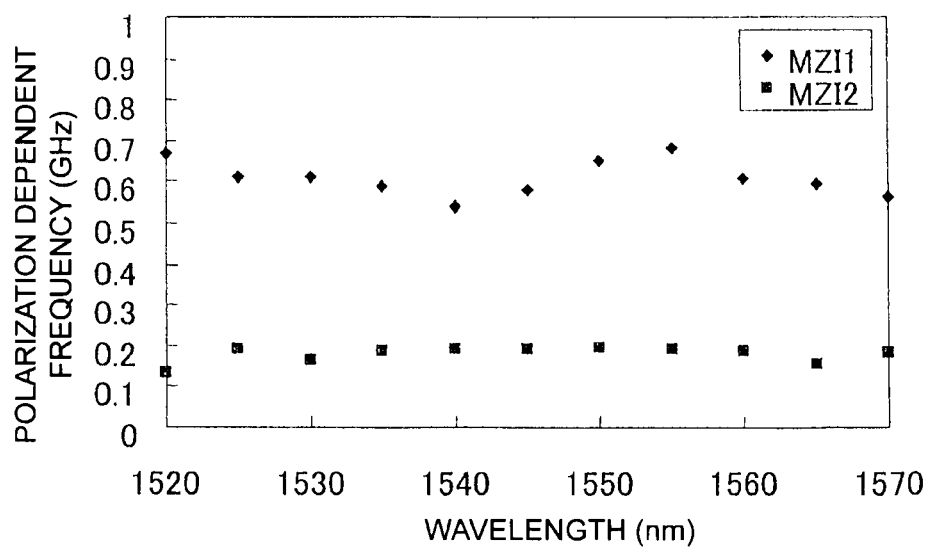
FIG. 15 is a graph showing the wavelength dependence of PDf when a difference occurs in PDf between the first and second MZIs due to the positional dependence of polarization conversion efficiency in a delay demodulation device in the PLC-type delay demodulation circuit of FIG. 14.

In the following exemplary embodiments, the same components as those in the PLC-type delay demodulation circuit shown in FIG. 14 are denoted by the same reference numerals.

First Exemplary Embodiment

A PLC-type delay demodulation circuit according to a first exemplary embodiment will be described with reference to FIGS. 1 to 8.

Figures 1, 2:
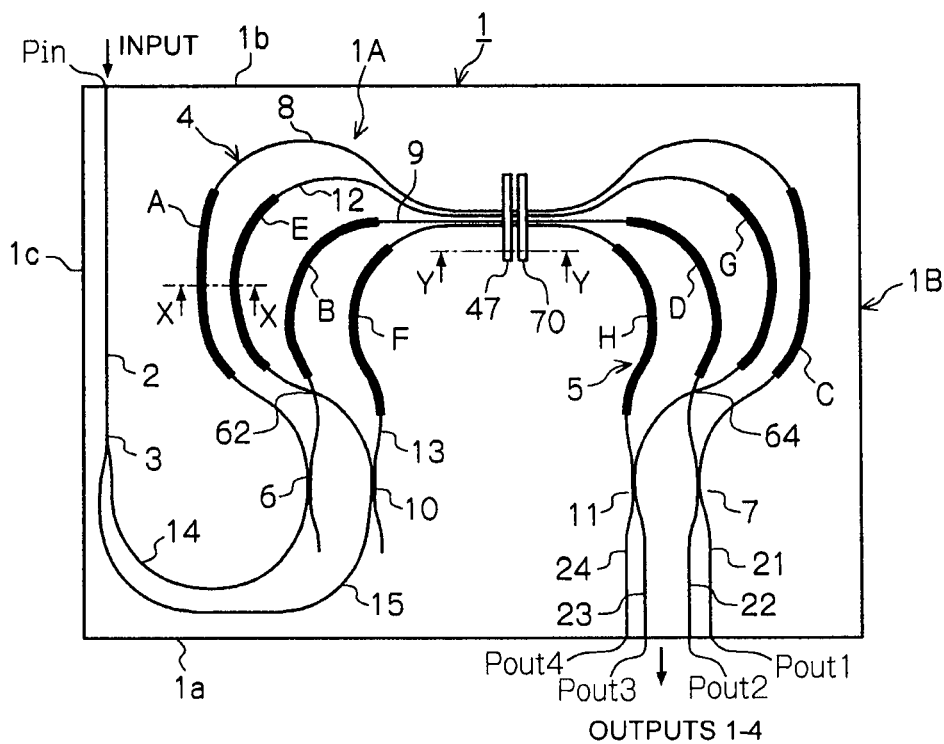
FIG. 1 is a plan view schematically illustrating the structure of a PLC-type delay demodulation circuit according to a first exemplary embodiment.
FIG. 2 is a block diagram schematically illustrating the structure of a DQPSK optical transmission system.

A PLC-type delay demodulation circuit 1 shown in FIG. 1 is a planar-lightwave-circuit-type (PLC-type) delay demodulation device in which a planar lightwave circuit 1A that is made of, for example, quartz-based glass and demodulates a DQPSK-modulated optical signal (DQPSK signal) is formed on one PLC chip 1B. The PLC-type delay demodulation circuit (hereinafter, referred to as a delay demodulation device) 1 is, for example, a 40 Gbps DQPSK delay demodulation device used in a 40 Gbps DQPSK optical transmission system shown in FIG. 2.

In the specification, the "delay demodulation device 1 (PLC-type delay demodulation circuit)" used in the DQPSK optical transmission system refers to a device in which a DQPSK signal is branched into two DQPSK signals, two MZIs delay the branched DQPSK signals by one bit such that the DQPSK signals interfere with each other, thereby converting the signals into intensity-modulated optical signals (light intensity signals), and the converted four light intensity signals (I channel signals and Q channel signals) are output to four light receiving elements of two sets of balanced receivers 51 and 52. That is, in the specification, the "delay demodulation device 1" refers to an optical demodulator that does not include a balanced receiver, includes one PLC chip used in the DQPSK optical transmission system, and demodulates the DQPSK signal.

In the optical transmission system shown in FIG. 2, DQPSK signals are transmitted from an optical transmitter 40 to an optical fiber transmission path 54. In the DQPSK signals, four information items of the values (0, 1, 2 and 3) of symbols, each of which is 2-bit data, are modulated into phase information of the phases ($\theta$, $\theta+\pi/2$, $\theta+\pi$, and $\theta+3\pi/2$) of carrier waves according to a variation in the values of two adjacent symbols. That is, the DQPSK signal has a meaning corresponding to 2 bits such that the phase of light in one symbol (time slot) is any one of four values ($\frac{1}{4}\pi$, $3\pi/4$, $5\pi/4$, and $7\pi/4$). Therefore, an optical receiver 50 can demodulate transmission data by detecting a phase difference (any one of the phase differences 0, $\pi/2$, $\pi$, and $3\pi/2$) between two adjacent symbols.

The DQPSK signals transmitted from the optical fiber transmission line 54 to the optical receiver 50 are converted into four light intensity signals by the delay demodulation device 1, and the light intensity signals are converted into electric signals by the balanced receivers 51 and 52. For example, a receiving electric circuit 53 performs a decoding process.

The delay demodulation device 1 shown in FIG. 1 includes a light input waveguide 2 that receives DQPSK signals, a Y-branch waveguide 3 serving as an optical splitter that branches the light input waveguide 2, and first and second Mach-Zehnder interferometers 4 and 5 that delay each of the DQPSK signals branched by the Y-branch waveguide 3 by one bit. In the following description, the Mach-Zehnder interferometer is referred to as an MZI.

The first MZI 4 includes an input coupler 6 that is connected to one (waveguide 14) of two waveguides (input waveguides) 14 and 15 branched from the Y-branch waveguide 3, an output coupler 7 having two output ends connected to two light output waveguides 21 and 22, and two arm waveguides (first arm waveguide 8 and second arm waveguide 9) that have different lengths and are connected between the two couplers 6 and 7. Similarly, the second MZI 5 includes an input coupler 10 that is connected to the other one (waveguide 15) of the two waveguides 14 and 15 branched from the Y-branch waveguide 3, an output coupler 11 having two output ends connected to two light output waveguides 23 and 24, and two arm waveguides (first arm waveguide 12 and second arm waveguide 13) that have different lengths and are connected between the two couplers 10 and 11.

Each of the input couplers 6 and 10 and the output couplers 7 and 11 is a 3-dB coupler (50% directional coupler) with two inputs and two outputs. One of the two input ends of the input coupler 6 of the first MZI 4 is connected to one (waveguide 14) of the two waveguides 14 and 15 branched from the Y-branch waveguide 3. One of the two input ends of the input coupler 10 of the second MZI 5 is connected to the other one (waveguide 15) of the two waveguides 14 and 15 branched from the Y-branch waveguide 3.

In this exemplary embodiment, the waveguide 14 is connected to the left input end of the input coupler 6 and the waveguide 15 is connected to the left input end of the input coupler 10. However, the waveguide 14 may be connected to the right input end of the input coupler 6, and the waveguide 15 may be connected to the right input end of the input coupler 10. As such, it is preferable that each of the waveguide 14 and the waveguide 15 be connected to one of the two input ends of each of the input couplers 6 and 10 on the same side. This is because the same balanced receivers 51 and 52, which are pairs of the same light receiving elements, can be used for two output ends (output ports Pout1 and Pout2) of the first MZI 4 and two output ends (output ports Pout3 and Pout4) of the second MZI 5.

Two output ends (a through port and a cross port) of the output coupler 7 of the first MZI 4 are connected to the first light output waveguide 21 and the second light output waveguide 22, respectively. Similarly, two output ends (a through port and a cross port) of the output coupler 11 of the second MZI 5 are connected to the third light output waveguide 23 and the fourth light output waveguide 24, respectively.

There is an optical path length difference ΔL between the two arm waveguides 8 and 9 of the first MZI 4 such that the phase of the DQPSK signal propagated through one (long first arm waveguide 8) of the arm waveguides 8 and 9 is delayed from the phase of the DQPSK signal propagated through the other arm waveguide (short second arm waveguide 9) by a value (for example, when the symbol rate is 40 Gbit/s, the symbol rate of each of an I channel and a Q channel may be 20 Gbit/s (which is half of 40 Gbit/s) and thus the amount of delay is 50 ps (picoseconds)) corresponding to one bit of the symbol rate (1-bit time slot: 1 time slot). Similarly, there is an optical path length difference ΔL between the two arm waveguides 12 and 13 of the second MZI 5 such that the phase of the DQPSK signal propagated through one (long arm waveguide 12) of the arm waveguides 12 and 13 is delayed from the phase of the DQPSK signal propagated through the other arm waveguide (short arm waveguide 13) by a value (for example, a delay of 50 ps (picoseconds) when the symbol rate is 40 Gbit/s) corresponding to one bit of the symbol rate.

In addition, the two MZIs 4 and 5 have interference characteristics of a phase difference of 90°. Therefore, the optical path length difference between the two arm waveguides 8 and 9 of the first MZI 4 is the sum of the amount of delay corresponding to 1 bit and a length corresponding to a phase of ¼π of the optical signal. The optical path length difference between the two arm waveguides 12 and 13 of the second MZI 5 is the difference between the amount of delay corresponding to 1 bit and a length corresponding to a phase of ¼π of the optical signal.

In this way, there is a phase difference of 90° between the phases of the interfering light components of adjacent time slots in the first MZI 4 and the phases of the interfering light components of adjacent time slots in the second MZI 5.

The first feature of the delay demodulation device 1 according to this embodiment is in the following configuration. The delay demodulation device 1 includes the wave plate 47 in central portions of the first and second arm waveguides 8 and 9 of the first MZI 4 and the first and second arm waveguides 12 and 13 of the second MZI 5 in such a manner that the wave plate 47 intersects all of the four arm waveguides 8, 9, 12, and 13, and the four arm waveguides are close to one another in the portion where the wave plate 47 is provided.

Further, the delay demodulation device 1 includes the second wave plate 70 at the first and second arm waveguides 8 and 9 of the first MZI 4 and the first and second arm waveguides 12 and 13 of the second MZI 5 in such a manner that the wave plate 70 intersects all of the four arm waveguides 8, 9, 12, and 13, and the four arm waveguides are close to one another in the portion where the wave plate 70 is provided.

The second feature of the delay demodulation device 1 is in the following configuration.

In the planar lightwave circuit (PLC) 1A, the arm waveguides of the MZIs 4 and 5 are placed to overlap each other in the same region, and the second arm waveguide 9 of the first MZI 4 and the first arm waveguide 12 of the second MZI 5 intersect each other at two points on both sides of the wave plate (two intersection points 62 and 64). That is, in the planar lightwave circuit (PLC) 1A, the second arm waveguide 9 of the first MZI 4 and the first arm waveguide 12 of the second MZI 5 are formed to overlap each other in the region surrounded by the first MZI 4, which is the outermost line.

In the waveguide arrangement in the portion were the wave plates 47 and 70 are inserted, between the arms of one MZI, an arm of the other MZI is placed, as in the following order: the first arm waveguide 8 of the first MZI 4, the first arm waveguide 12 of the second MZI 5, the second arm waveguide 9 of the first MZI 4, the second arm waveguide 13 of the second MZI 5. That is, in the waveguide arrangement in the portion where the wave plates 47 and 70 are inserted, the first arm waveguide 12 of the second MZI 5 is placed between the two arm waveguides 8 and 9 of the first MZI 4.

This configuration makes it possible to reduce the pitch between waveguides in the wave plate insertion portion with a minimum number of intersection portions.

The arm waveguide 9 of the MZI 4 and the arm waveguide 12 of the MZI 5 intersect each other at the intersection points 62 and 64. Lights (DQPSK signals) that propagate through the two arm waveguides, respectively, pass through the intersection portions and then propagate through the same arm waveguides. For example, the two arm waveguides 9 and 12 intersect each other at the intersection point 62, and the DQPSK signals that propagate through the two arm waveguides 9 and 12, respectively, pass through the intersection portion and then propagate through the same arm waveguides 9 and 12.

The third feature of the delay demodulation device 1 is in the following configuration.

The optical path length L1 of the shorter arm waveguide 9 of the first MZI 4 is different from the optical path length L2 of the shorter arm waveguide 13 of the second MZI 5, and the optical path lengths L21 and L22 from the Y-branch waveguide 3 through the shorter arm waveguide 9 of the first MZI 4 to the output ends (output ports of the light output waveguides 21 and 22) of the first MZI 4 and the optical path lengths L23 and L24 from the Y-branch waveguide 3 through the shorter arm waveguide 13 of the second MZI 5 to the output ends (output ports of the light output waveguides 23 and 24) of the second MZI 5 are all substantially equal.

The lengths of four optical paths of the optical signals from the Y-branch waveguide 3 to four output ends (Pout1 to Pout4) are as follows.

The length of an optical path from the Y-branch waveguide 3 to the output port (output end) Pout1 through the waveguide 14, the input coupler 6 of the first MZI 4, the short arm waveguide 9, the output coupler 7, and the first light output waveguide 21 is L21.

The length of an optical path from the Y-branch waveguide 3 to the output port (output end) Pout2 through the waveguide 14, the input coupler 6 of the first MZI 4, the short arm waveguide 9, the output coupler 7, and the second light output waveguide 22 is L22.

The length of an optical path from the Y-branch waveguide 3 to the output port (output end) Pout3 through the waveguide 15, the input coupler 10 of the second MZI 5, the short arm waveguide 13, the output coupler 11, and the third light output waveguide 23 is L23.

The length of an optical path from the Y-branch waveguide 3 to the output port (output end) Pout4 through the waveguide 15, the input coupler 10 of the second MZI 5, the short arm waveguide 13, the output coupler 11, and the fourth light output waveguide 24 is L24.

The third feature mentioned above is, in other words, that the optical path length L1 of the shorter arm waveguide 9 of the first MZI 4 is different from the optical path length L2 of the shorter arm waveguide 13 of the second MZI 5, and the four optical path lengths L21 to L24 are all equal.

In this exemplary embodiment, in order to achieve the third feature, the optical path length L1 of the arm waveguide 9 is greater than the optical path length L2 of the arm waveguide 13, the optical path lengths of the first to fourth light output waveguides 21 to 24 are equal to each other, and the length of the waveguide 15 is greater than that of the waveguide 14 by a value L1-L2.

In this case, each of the waveguide 15 and the waveguide 14 is a U-shaped waveguide including a curved waveguide, and the waveguide 15 is arranged along the waveguide 14 outside the waveguide 14. In this way, it is possible to easily adjust the lengths of the waveguides in a narrow region.

Next, the U-shaped waveguides 14 and 15 will be described in detail.

An input end (input port Pin) of the light input waveguide 2 is provided at an end surface 1b, which is one (upper long side) of the long sides of the PLC chip 1B having a rectangular shape in a plan view. The light input waveguide 2 extends in a straight line from the input port Pin along an end surface 1c, which is one (left short side) of the short sides of the PLC chip 1B, and is then connected to the input end of the Y-branch waveguide 3. The waveguide 14 connected to one output end of the Y-branch waveguide 3 is a U-shaped waveguide that is curved at an angle of about 180° and connects the Y-branch waveguide 3 and the input coupler 6.

The waveguide 15 connected to the other output end of the Y-branch waveguide 3 is a U-shaped waveguide which is arranged outside the waveguide 14, that is, which is arranged so as to be curved close to an end surface 1a opposite to the end surface 1b. The U-shaped waveguide includes a waveguide that is curved at an angle of about 90°, a straight waveguide, and a waveguide that is curved at an angle of about 90°, and connects the Y-branch waveguide 3 and the input coupler 10.

As such, when each of the waveguide 15 and the waveguide 14 has a U shape, it is possible to easily adjust the lengths of the waveguides in a narrow region.

In this exemplary embodiment shown in FIG. 1, the waveguide 15 is arranged outside the waveguide 14, but the invention is not limited thereto. For example, the waveguides 14 and 15 may be formed as follows, depending on the difference between the lengths thereof. The waveguide 14 may be arranged outside the waveguide 15 between the Y-branch waveguide 3 and an intersection point therebetween, the waveguide 14 and the waveguide 15 may intersect each other at the intersection point, and then the waveguides 14 and 15 may be connected to the input couplers 6 and 10 shown in FIG. 1, respectively.

The planar lightwave circuit 1A shown in FIG. 1 is a circuit including, for example, the light input waveguide 2, the Y-branch waveguide 3, the first and second MZIs 4 and 5, and four light output waveguides 21 to 24, which are made of quartz-based glass. The delay demodulation device 1 including the planar lightwave circuit 1A is manufactured as follows.

Figure 3:
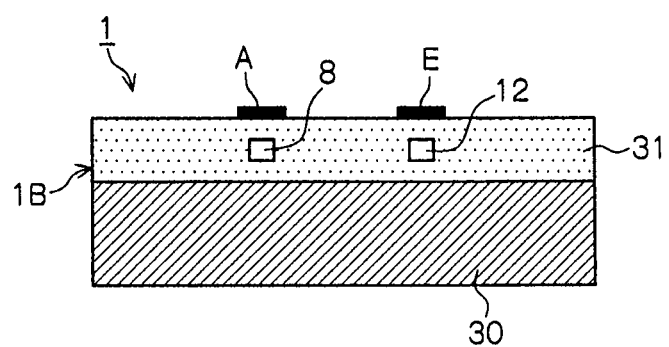
FIG. 3 is a cross-sectional view taken along the line X-X of FIG. 1.

A silica material ($SiO_2$-based glass particles) for forming a lower cladding layer and a core layer is deposited on a PLC substrate 30, such as a silicon substrate shown in FIG. 3, by a flame hydrolysis deposition (FHD) method. Then, heating is performed to fuse a glass film and make the glass film transparent. Then, desired waveguides are formed by photolithography and reactive ion etching, and an upper cladding layer is formed by the FHD method. In FIG. 3, a cladding layer 31 including the lower cladding layer and the upper cladding layer is formed on the PLC substrate 30, and the arm waveguides 8 and 12 are formed as a core layer in the cladding layer 31. The PLC substrate 30 has a rectangular shape in a plan view, as shown in FIG. 1. The planar shape of the PLC substrate 30 is not limited to the rectangle, but it may be a square shape or other shapes.

In the delay demodulation device 1 according to this exemplary embodiment, the first MZI 4 and the second MZI 5 are formed on the PLC substrate 30, which is a planar lightwave circuit board, so as to be substantially symmetric with respect to an insertion portion of a first half-wave plate 47.

In order to reduce a polarization dependent frequency PDf, the first half-wave plate 47 whose main axis is inclined at an angle of 45° with respect to the refractive index main axis of the arm waveguide is inserted in the central portions of the two arm waveguides 8 and 9 of the first MZI 4 and in the central portions of the two arm waveguides 12 and 13 of the second MZI 5 in the delay demodulation device 1.

In addition, in the delay demodulation device 1, a second half-wave plate 70 whose main axis is parallel or horizontal to the refractive index main axis of the arm waveguide is inserted at a position that is spaced 200 μm apart from the central portions of the two arm waveguides 8 and 9 of the first MZI 4 to the output side and a position that is spaced 200 μm apart from the central portions of the two arm waveguides 12 and 13 of the second MZI 5 to the output side, in order to prevent the deterioration of the polarization dependent frequency PDf due to polarization in the coupler.

Even when polarization occurs in the coupler, as described in WO 2008/084707, the use of the first and second half-wave plates 47 and 70 enables the interference conditions of polarized light to be the same as the interference conditions of general non-polarized light. Therefore, the polarization dependence of an interference circuit does not occur.

Figure 4:
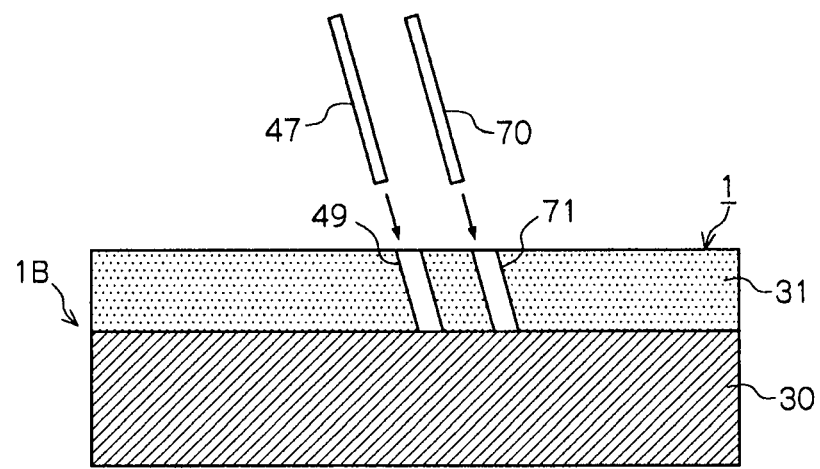
FIG. 4 is a cross-sectional view taken along the line Y-Y of FIG. 1.

As shown in FIG. 4, a groove 49 for inserting the first half-wave plate 47 and a groove 71 for inserting the second half-wave plate 70 are formed in the cladding layer 31. The groove 49 and the groove 71 are inclined at an angle of about 8° in order to prevent loss due to the reflection of light from the half-wave plates 47 and 70. As shown in FIG. 4, the half-wave plates 47 and 70 are respectively arranged in the grooves 49 and 71 while being inclined at an angle of about 8°. The grooves 49 and 71 are vertical to the waveguides in the plane of the substrate and are inclined at an angle of about 8° in the vertical direction (the thickness direction of the substrate) so as to pass through the centers of the two MZIs.

In the delay demodulation device 1, as shown in FIG. 1, the central portions of the two arm waveguides 8 and 9 of the first MZI 4 extend in parallel so as to be close to each other, and the central portions of the two arm waveguides 12 and 13 of the second MZI 5 extend in parallel so as to be close to each other.

At the centers of the arm waveguides 8 and 9 and the centers of the arm waveguides 12 and 13, portions into which the half-wave plates 47 and 70 are inserted have a large width in order to prevent diffraction loss.

In FIG. 1, the half-wave plate 70 is arranged close to the half-wave plate 47, but the position of the half-wave plate 70 is not limited thereto. It is preferable that the half-wave plate 70 be arranged close to the half-wave plate 47 in a portion with a large width in each of the arm waveguides 8, 9, 12, and 13 where the half-wave plate 47 is arranged.

Another characteristic of the delay demodulation device 1 is as follows.

As shown in FIG. 1, the output ends (the output ports Pout1 and Pout2) of two light output waveguides 21 and 22 and the output ends (the output ports Pout3 and Pout4) of two light output waveguides 23 and 24 are formed at the same end surface 1a of the PLC chip 1B. That is, the output ports Pout1 to Pout4, which are the output ends of four light output waveguides 21 to 24, are provided at the same end surface 1a, which is one of the four sides of the PLC chip 1B, so as to be close to each other.

The input end (input port Pin) of the light input waveguide 2 is provided at the end surface 1b opposite to the end surface 1a of the PLC chip 1B.

In the delay demodulation device 1, heaters are formed on the two arm waveguides 8 and 9 of the first MZI 4 and the two arm waveguides 12 and 13 of the second MZI 5.

In this exemplary embodiment, for example, heaters A and C are formed on the arm waveguide 8 on both sides of the center thereof, and heaters B and D are formed on the arm waveguide 9 on both sides of the center thereof. In addition, heaters E and G are formed on the arm waveguide 12 on both sides of the center thereof, and heaters F and H are formed on the arm waveguide 13 on both sides of the center thereof. Each of the heaters A to H is a Ta-based thin film heater that is formed on the upper cladding (the cladding layer 31 shown in FIG. 3) by sputtering, above the corresponding arm waveguide. FIG. 3 shows the heaters A and E that are formed on the cladding layer 31 above the arm waveguides 8 and 12, respectively.

In the delay demodulation device 1, the output ends of the light output waveguides 21 and 22 are the first and second output ports Pout1 and Pout2 that output optical signals (intensity-modulated optical signals), which are outputs 1 and 2 (see FIG. 5), having a phase difference of $\pi$ therebetween. The output ends of the light output waveguides 23 and 24 are the third and fourth output ports Pout3 and Pout4 that output optical signals, which are outputs 3 and 4 (see FIG. 5), having a phase difference of $\pi$ therebetween.

In the delay demodulation device 1 having the above-mentioned structure, in the first MZI 4, the DQPSK signal (optical signal) transmitted from the optical fiber transmission path 54 to the optical receiver 50 is branched by the Y-branch waveguide 3 and the branched DQPSK signals are propagated through the two arm waveguides 8 and 9 with different lengths. The MZI 4 delays the phase of the DQPSK signal propagated through the arm waveguide 8 from the phase of the optical signal propagated through the arm waveguide 9 by $+\frac{1}{4}\pi$ corresponding to one bit of the symbol rate. Similarly, the second MZI 5 delays the phase of the DQPSK signal propagated through the arm waveguide 12 from the phase of the optical signal propagated through the arm waveguide 13 by $-\frac{1}{4}\pi$ corresponding to one bit of the symbol rate.

The delay demodulation device 1 drives the heaters A to D of the MZI 4 and the heaters E to H of the MZI 5 to adjust the polarization dependent frequency PDf or perform phase adjustment (phase trimming) such that the phase difference between the two MZIs 4 and 5 is $\pi/2$.

Examples

The planar lightwave circuit (PLC) 1A including the input waveguide 2, the Y-branch waveguide 3, the MZIs 4 and 5, and the light output waveguides 21 to 24, which were made of quartz-based glass, was formed on the silicon substrate 30 shown in FIG. 3 by a flame hydrolysis deposition (FHD) method, photolithography, and reactive ion etching, thereby manufacturing the 40 Gbps DQPSK delay demodulation device 1. The four arm waveguides, i.e., the first and second arm waveguides 8 and 9 of the first MZI 4 and the first and second arm waveguide 12 and 13 of the second MZI 5, were manufactured such that they were close to one another at regular intervals of 40 μm in the wave plate insertion portion. In addition, the grooves 49 and 71 (see FIG. 4) were formed by dicing and the half-wave plates 47 and 70 were inserted into the grooves 49 and 71.

In the insertion of the wave plates 47 and 70 into the delay demodulation device 1 of this exemplary embodiment, the wave plates 47 and 70 were cut to 2 mm, which is half the original length, and then the wave plates 47 and 70 were inserted such that the center of each wave plate was nearly at the center of the four arm waveguides 8, 9, 12, and 13.

In the manufactured delay demodulation device 1, the difference (specific refractive index difference Δ) between the refractive index of the cladding layer and the refractive index of the core layer was 1.5%, and the circuit (the PLC chip 1B) had a small size of 13 mm by 16.5 mm. FSR was 23 GHz. Some of the heaters on the two MZIs 4 and 5 were driven to adjust the polarization dependent frequency PDf. After the adjustment, some of the heaters on the two MZIs 4 and 5 were driven to perform phase adjustment (phase trimming) such that the phase difference between the two MZIs 4 and 5 was $\pi/2$. That is, interference characteristics in which a phase difference of 90° occurred between the two MZIs 4 and 5 were obtained by the phase adjustment.

At that time, the half-wave plates 47 and 70 were selected and used such that good PDf characteristics were obtained from both the MZI 4 and the MZI 5.

Then, a fiber block including one optical fiber was connected to the end surface 1b of the PLC chip 1B in which the end of the light input waveguide 2 to which the optical signal was input was provided. A fiber array including four optical fibers arranged therein was connected to the end surface 1a of the PLC chip 1B, which was the ends (output ports) of the light output waveguides 21, 22, 23, and 24 respectively outputting optical signals, which were outputs 1 to 4, and packaging was performed. In addition, a Peltier element and a thermostat were used as a temperature control mechanism. In this way, a module including the delay demodulation device 1 was manufactured.

Figure 5:
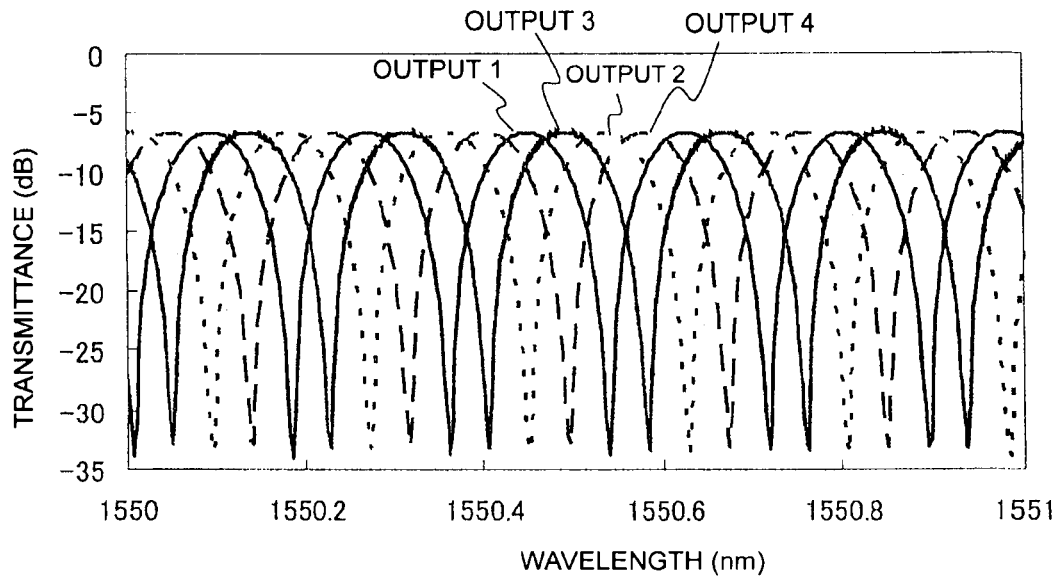
FIG. 5 is a graph illustrating the spectrum of the PLC-type delay demodulation circuit.
Figure 6:
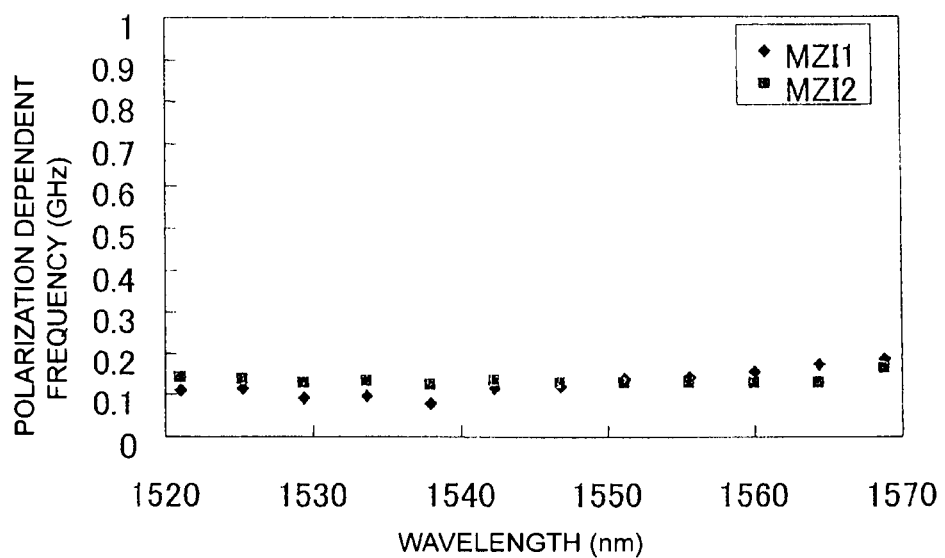
FIG. 6 is a graph illustrating the wavelength dependence of PDf of the PLC-type delay demodulation circuit.

The insertion loss spectrum and the polarization dependent frequency PDf of the manufactured 40 Gbps DQPSK delay demodulation device (DQPSK PLC-type delay demodulation circuit) 1 were evaluated in the C-band (1520 nm to 1570 nm) generally used in multi-wavelength optical communication. FIG. 5 shows the spectrum in the vicinity of a wavelength of 1550 nm, and FIG. 6 shows PDf in the entire C-band. First, as can be seen from FIG. 5, a good interference spectrum is obtained. The insertion loss was equal to or less than 6.5 dB in the entire C-band. As can be seen from FIG. 6, when PDf is equal to or less than 0.2 GHz, good characteristics are obtained in the entire C-band.

Figure 7:
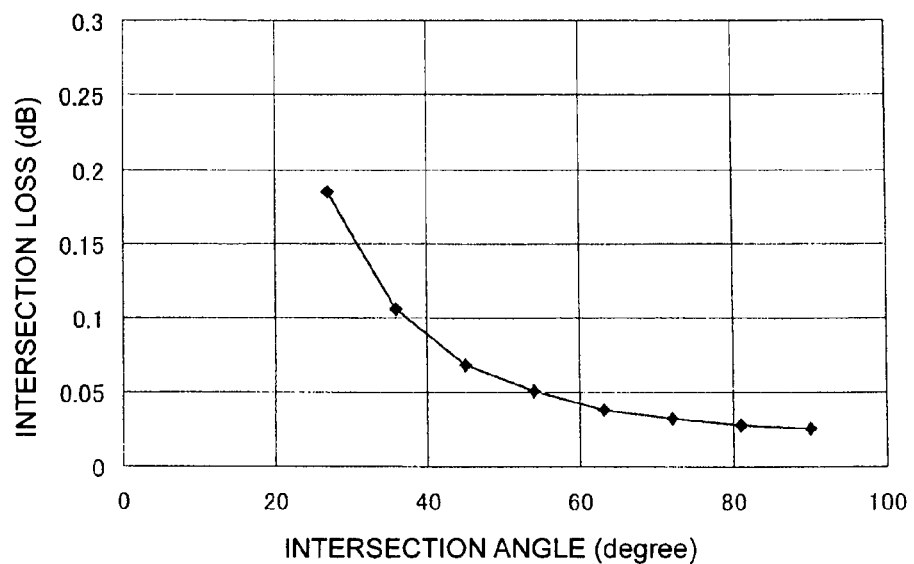
FIG. 7 is a graph illustrating the relationship between an intersection angle and intersection loss in the PLC-type delay demodulation circuit.

In order to estimate intersection loss, the same waveguides as those in the delay demodulation device 1 were used to manufacture intersection waveguides for test having various intersection angles, insertion loss was measured, and the relationship between the intersection angle and loss per intersection point was calculated. The result is shown in FIG. 7.

Table 1 shows the above-mentioned result and the calculation result of intersection loss between the arm waveguides based on the intersection angles of the arm waveguides at the intersection points 61 to 64.

For comparison, Table 2 shows the calculation result of intersection loss in the delay demodulation device shown in FIG. 14.

TABLE 1

Intersection angle and intersection loss in first exemplary embodiment

| Intersection point/arm | Intersection point | | | | Arm | | | |
|---|---|---|---|---|---|---|---|---|
| Number | 62, 64 | — | — | — | 8 | 9 | 12 | 13 |
| Intersection angle (degree) | 63 | — | — | — | — | — | — | — |
| Intersection loss (dB) | 0.04 | — | — | — | 0.0 | 0.08 | 0.08 | 0.0 |

TABLE 2

Figure 11:
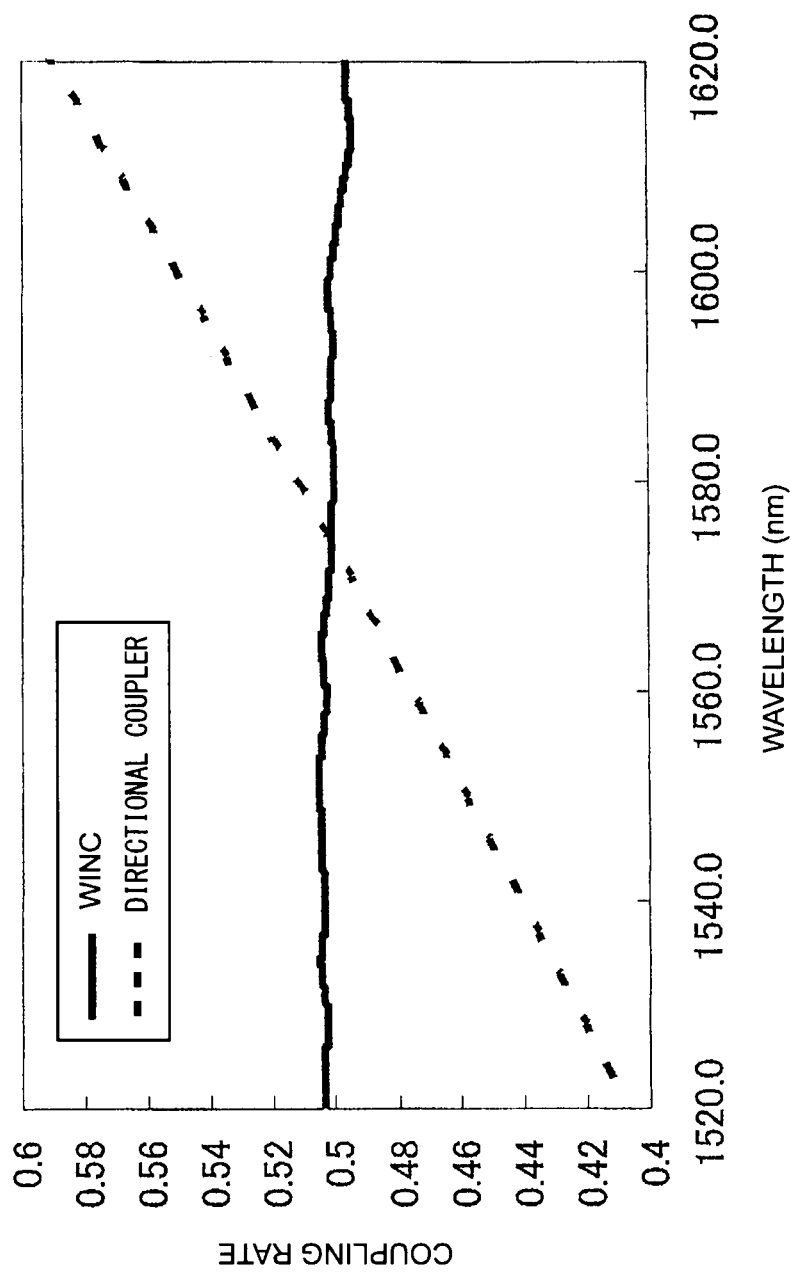
FIG. 11 is a diagram for characteristics showing wavelength-characteristic-calculated values (as a solid line) of coupling ratio of a WINC used as input and output couplers of a PLC-type delay demodulation circuit according to a fourth exemplary embodiment, and also showing wavelength-characteristic-calculated values (as a broken line) of coupling ratio of a general directional coupler as a comparison.

Intersection angle and intersection loss in delay demodulation device shown in FIG. 11

| Intersection point/arm | Intersection point | | | | Arm | | | |
|---|---|---|---|---|---|---|---|---|
| Number | 61, 64 | 62, 63 | 65, 68 | 66, 67 | 8 | 9 | 12 | 13 |
| Intersection angle (degree) | 47 | 77 | 88 | 47 | — | — | — | — |
| Intersection loss (dB) | 0.07 | 0.03 | 0.03 | 0.07 | 0.2 | 0.2 | 0.2 | 0.2 |

As described above, two arm waveguides intersect each other at the intersection points 62 and 64, and light components (DQPSK signals) propagated through the two arm waveguides pass through the intersection portions and are then propagated through the same arm waveguides. As can be seen from a graph shown in FIG. 7, when the intersection angle at each of the intersection points 62 and 64 is equal to or more than about 35°, intersection loss is equal to or less than 0.1 dB, and it is considered that the light components are propagated through the same waveguides before and after intersection.

As can be seen from Tables 1 and 2, in the delay demodulation device according to this exemplary embodiment, it is possible to reduce intersection at a small intersection angle, which results in a reduction in intersection loss in each arm waveguide.

<Evaluation of PDf>

Figure 8:
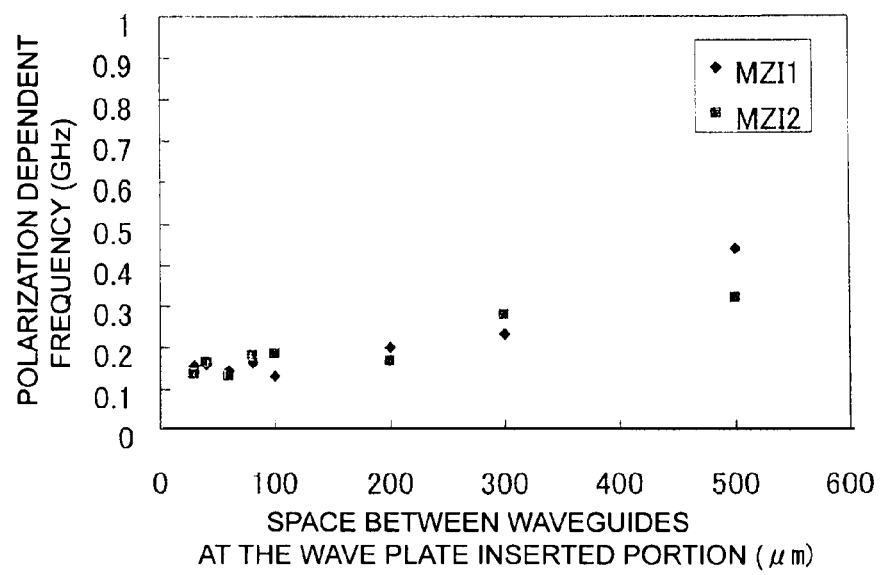
FIG. 8 is a graph illustrating the relationship between space between waveguides at the wave plate inserted portion and PDf in the PLC-type delay demodulation circuit.

PDf was evaluated with respect to delay demodulation devices manufactured such that the intervals of the four arm waveguides, i.e., the first and second arm waveguides 8 and 9 of the first MZI 4 and the first and second arm waveguide 12 and 13 of the second MZI 5, in the wave plate insertion portion were 30, 40, 60, 80, 100, 200, 300, and 500 µm. FIG. 8 shows the relationship between waveguide interval and PDf. In all the delay demodulation devices, the wave plates 47 and 70 were inserted such that the center of each wave plate was nearly at the center of the four arm waveguides 8, 9, 12, and 13.

FIG. 8 shows that a larger waveguide interval leads to more deterioration of PDF, and, in particular, when the intervals are 300 µm or more, the PDF is 0.3 GHz or more.

Further, FIG. 8 shows that in the delay demodulation device 1, it is preferable that the waveguide intervals in the central portions of the arm waveguides 8, 9, 12, and 13, particularly the waveguide intervals in the wave plate insertion portion where the wave plates 47 and 70 are inserted, are regular intervals of 30 to 100 µm. A waveguide interval within such a range suppresses the effect of the positional dependence of the polarization conversion efficiency of the wave plates 47 and 70, making it possible to reduce the polarization deviation amount PDf to 0.2 GHz or less.

The first embodiment having the above configuration has the following operation and effects.

The configuration includes the wave plate 47 in central portions of the first and second arm waveguides 8 and 9 of the first MZI 4 and the first and second arm waveguides 12 and 13 of the second MZI 5 in such a manner that the wave plate 47 intersects all of the four arm waveguides, and the four arm waveguides 8, 9, 12, and 13 are close to one another in the portion where the wave plate 47 is provided.

According to this configuration, all of the four arm waveguides 8, 9, 12, and 13 pass through only a narrow region of the wave plate 47. As a result, susceptibility to the positional dependence of the polarization conversion efficiency of the wave plate 47 is reduced, and the achievement of excellent characteristics in both MZIs is facilitated. Further, cost can be reduced.

That is, (1) all of the four arm waveguides pass through only a narrow region of the wave plate, and, therefore, the effect of the positional dependence of the polarization conversion efficiency of the wave plate can be suppressed, whereby polarization dependence can be reduced. In other words, the effect of the positional dependence of the polarization conversion efficiency of the wave plate 47 at the position where the wave plate 47 intersects the two arm waveguides of each of the MZIs 4 and 5, as well as the effect of the positional dependence of the polarization conversion efficiency of the wave plate between the positions of the two arm waveguides of the first MZI 4 and the positions of the two arm waveguides of the second MZI 5, can be both suppressed. As a result, polarization dependence can be reduced.

(2) Further, an excellent portion of the wave plate 47 can be used for both of the first and second MZIs 4 and 5, and, therefore, excellent characteristics can be obtained in both of the MZIs 4 and 5 at the same time.

(3) A small-sized wave plate 47 can be used, whereby cost reduction is possible.

Similarly, the configuration includes the second wave plate 70 at the first and second arm waveguides 8 and 9 of the first MZI 4 and the first and second arm waveguides 12 and 13 of the second MZI 5 in such a manner that the second wave plate 70 intersects all of the four arm waveguides, and the four arm waveguides are close to one another in the portion where the wave plate 70 is provided. According to this configuration, all of the four arm waveguides 8, 9, 12, and 13 are less susceptible to the positional dependence of the polarization conversion efficiency of the wave plate 70, and the achievement of excellent characteristics in both MZIs is facilitated. Further, cost can be reduced.

In the planar lightwave circuit 1A, the arm waveguides of the MZIs 4 and 5 are placed to overlap each other in the same region, and the second arm waveguide 9 of the first MZI 4 and the first arm waveguide 12 of the second MZI 5 intersect each other on both sides of the wave plates 47 and 70, i.e., at two intersection points 62 and 64. Further, in the waveguide arrangement in the wave plate insertion portion, between the arm waveguides of one MZI, an arm waveguide of the other MZI is placed, as in the following order: the first arm waveguide 8 of the first MZI 4, the first arm waveguide 12 of the second MZI 5, the second arm waveguide 9 of the first MZI 4, the second arm waveguide 13 of the second MZI 5. This makes it possible to reduce the pitch between waveguides in the wave plate insertion portion with a minimum number of intersection portions, whereby low PDf characteristics can be obtained with low loss.

The optical path length L1 of the shorter arm waveguide 9 of the first MZI 4 is different from the optical path length L2 of the shorter arm waveguide 13 of the second MZI 5, and the optical path lengths L21 and L22 from the Y-branch waveguide 3 through the shorter arm waveguide 9 of the first MZI 4 to the output ends (output ports of the light output waveguides 21 and 22) of the first MZI 4 and the optical path lengths L23 and L24 from the Y-branch waveguide 3 through the shorter arm waveguide 13 of the second MZI 5 to the output ends (output ports of the light output waveguides 23 and 24) of the second MZI 5 are all substantially equal. This improves the flexibility of design, and enables compact arrangement with fewer intersections as compared with the case where the arm waveguide 9 and the arm waveguide 13 are formed to have the same optical path length.

Since the size of the PLC chip 1B is reduced, a uniform temperature distribution is obtained in the plane of the planar lightwave circuit 1A and it is possible to significantly reduce the shift of a center wavelength due to a variation in the environment temperature.

Since the size of the PLC chip 1B is reduced, a stress distribution in the plane of the PLC chip 1B which causes birefringence is reduced, and it is possible to significantly reduce the shift of the center wavelength due to a variation in the environment temperature. In this way, it is possible to obtain a delay demodulation device with little wavelength shift due to a variation in the environment temperature and a small initial polarization dependent frequency PDf.

When the size of the PLC chip 1B is reduced, it is also expected that the size or power consumption of a delay demodulation module using the delay demodulation device 1 will be reduced.

The first MZI 4 and the second MZI 5 are formed on the PLC substrate 30 so as to be symmetric. Therefore, it is possible to further reduce the size and polarization dependent frequency PDf of the PLC chip 1B.

The heaters A to H are formed on the two arm waveguides of each of the first and second MZIs 4 and 5. Therefore, it is possible to drive some of the heaters of the two MZIs 4 and 5 to adjust the polarization dependent frequency PDf. After the adjustment, it is possible to drive some of the heaters of the two MZIs 4 and 5 to perform phase adjustment (phase trimming) such that the phase difference between the two MZIs is π/2.

Second Embodiment

A planar-lightwave-circuit-type delay demodulation device 100 according to a second embodiment, which embodies the present invention, will be described with reference to FIG. 9.

The delay demodulation device 100 according to the second embodiment is different from the delay demodulation device 1 according to the first embodiment in that the first MZI 4 is placed in the region inside the second MZI 5, and the arm waveguides 8 and 9 of the first MZI 4 do not intersect the arm waveguides 12 and 13 of the second MZI 5.

Specifically, in the delay demodulation device 100, in the planar lightwave circuit 1A, each of the arm waveguides 12 and 13 of the second MZI 5 is formed in the region inwardly deviated from each of the arm waveguides 8 and 9 of the first MZI 4. This achieves the configuration in which the optical path length L1 of the shorter arm waveguide 9 of the first MZI 4 is different from the optical path length L2 of the shorter arm waveguide 13 of the second MZI 5. For example, the configuration in which the optical path length L1 of the arm waveguide 9 is greater than the optical path length L2 of the arm waveguide 13 is achieved. At the same time, the arm waveguides 8 and 9 of the first MZI 4 are prevented from intersecting the arm waveguides 12 and 13 of the second MZI 5.

Because the arm waveguides 8 and 9 do not intersect the arm waveguides 12 and 13, the four arm waveguides in the wave plate insertion portion where the wave plates 47 and 70 are inserted are placed in the following order: the first arm waveguide 8 of the first MZI 4, the second arm waveguide 9 of the first MZI 4, the first arm waveguide 12 of the second MZI 5, the second arm waveguide 13 of the second MZI 5.

In contrast, in the delay demodulation device 1 mentioned above, in the planar lightwave circuit 1A, the arm waveguides of the MZIs 4 and 5 are placed to overlap each other in the same region, and the second arm waveguide 9 of the first MZI 4 and the first arm waveguide 12 of the second MZI 5 intersect each other on both sides of the wave plate (at two intersection points 62 and 64).

In other respects, the configuration of the delay demodulation device 100 is the same as that of the delay demodulation device 1 according to the first embodiment.

The delay demodulation device 100 according to the second embodiment has the following operation and effects in addition to the operation and effects of the first embodiment mentioned above.

The loss that accompanies the intersection of arm waveguides can be eliminated, whereby a delay demodulation device with low loss can be achieved.

In particular, in the case where the optical path length difference ΔL between the arm waveguides 8 and 9 of the first MZI 4 and also between the arm waveguides 12 and 13 of the second MZI 5 is relatively small, it is easy to place the first MZI 4 in the region inside the second MZI 5, and such a case is thus preferable.

Third Embodiment

A planar-lightwave-circuit-type delay demodulation device 110 according to a third embodiment, which embodies the present invention, will be described with reference to FIG. 10.

One of the features of the delay demodulation device 110 according to the third embodiment is that the optical path length of the shorter arm waveguide 9 of the first MZI 4 is the same as the optical path length of the shorter arm waveguide 13 of the second MZI 5, the waveguides 14 and 15 are the same length, and the four light output waveguide 21 to 24 are all the same length.

Another feature of the delay demodulation device 110 is that the light input waveguide 2 and the four light output waveguides 21 to 24 are all provided on the same end surface 1a.

Specifically, in the delay demodulation device 110, an input end (input port Pin) of the light input waveguide 2 is provided on the end surface 1a, which forms one of the long sides (lower long side) of the PLC chip 1B having a rectangular shape in plan view. Further, the output ends (output ports Pout 1 to Pout 4) of the light output waveguides 21 to 24 are also provided on the end surface 1a. The input port Pin and the output ports Pout1 to Pout 4 are located, for example, on both sides of the lengthwise center of the end surface 1*a* (center in the horizontal direction in FIG. 10).

The light input waveguide 2 extends in a straight line from the input port Pin in the direction along the short sides of the PLC chip 1B, and, on the way, is connected to the input end of the Y-branch waveguide 3. Meanwhile, the light output waveguides 21 to 24 extend in a straight line from the output ports Pout 1 to Pout 4 in the direction along the short sides of the PLC chip 1B, and, on the way, is connected to the output couplers 7 and 11. In other respects, the configuration of the delay demodulation device 110 is the same as that of the delay demodulation device 1 according to the first embodiment.

The delay demodulation device 110 according to the third embodiment has the following operation and effects in addition to the operation and effects of the first embodiment mentioned above.

The input port Pin and the four output ports Pout 1 to Pout 4 can be all placed on the same end surface 1*a*.

Figures 9, 10:
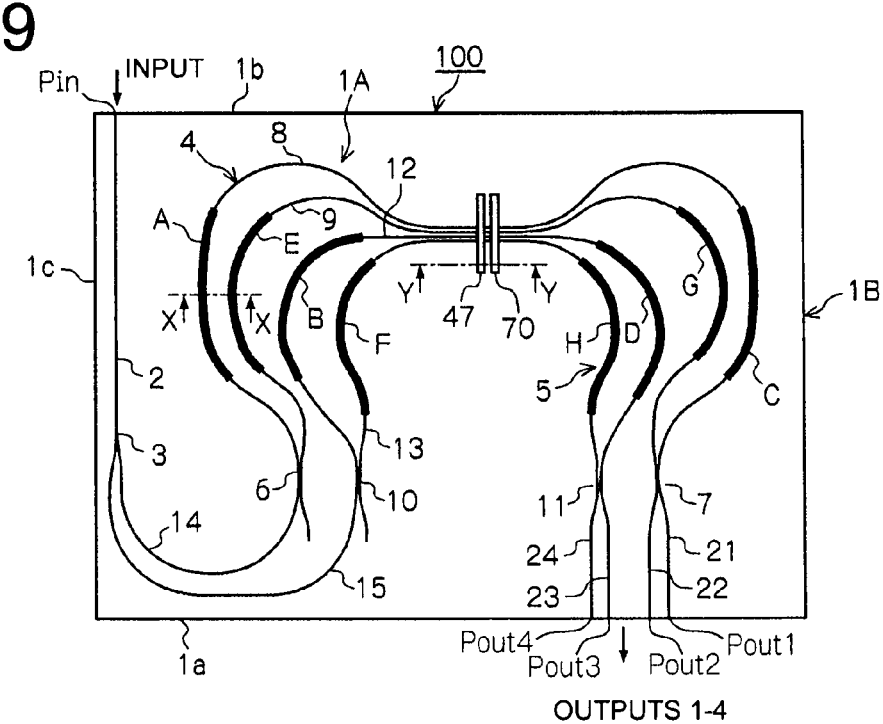
FIG. 9 is a plan view schematically illustrating the structure of a PLC-type delay demodulation circuit according to a second exemplary embodiment.
FIG. 10 is a plan view schematically illustrating the structure of a PLC-type delay demodulation circuit according to a third exemplary embodiment.

As compared with the delay demodulation device 1 shown in FIG. 1 and the delay demodulation device 100 shown in FIG. 9, the transverse dimension of the PLC chip 1B (dimension in the horizontal direction in FIG. 10) is reduced, making it possible to achieve a small-sized PLC chip 1B, which is nearly square in plan view.

Fourth Exemplary Embodiment

A planar-lightwave-circuit-type delay demodulation device according to the fourth exemplary embodiment of the invention will be described with reference to FIG. 1 and FIGS. 11-13.

The delay demodulation device according to the present embodiment has a characteristic that input couplers 6, 19 and output couplers 7, 11 of the delay demodulation device according to the first exemplary embodiment are replaced with a Wavelength Insensitive Coupler (WINC). It is noted that other components are same as ones of the first exemplary embodiment.

The WINC is comprised of directional couplers having coupling ratios of about 50% and 100% respectively, and a Mach-Zehnder Interferometer consisting of two arm waveguides binding directional couplers above and having an optical path length difference of about 0.35 um. Comparing to a directional coupler in general, a wavelength dependence of coupling ratio is reduced in the WINC above.

FIG. 11 shows wavelength-characteristic-calculated values of coupling ratio of the WINC above and the values are indicated as a solid line. As a comparison, wavelength-characteristic-calculated values of coupling ratio of a general directional coupler are indicated as a broken line. As can be seen from FIG. 11 above, in the WINC (the solid line), coupling ratio of about 50% is obtained in the entire C~L bands (about 1520 nm-about 1620 nm) and the wavelength-characteristic becomes flatten in large scale to compare with the general directional coupler (see the broken line).

Figure 12A:
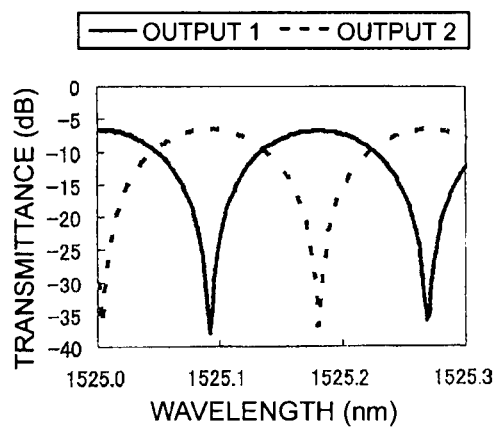
FIGS. 12A, 12B and 12C are diagrams for characteristics showing spectrum, in the vicinity of wavelength of 1525 nm, 1570 nm and 1610 nm respectively, of output ports 1 and 2 of a delay demodulation device with using the WINC according to the fourth exemplary embodiment.
Figure 12B:
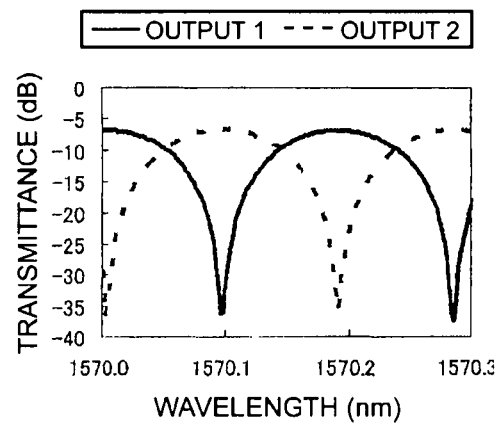
Figure 12C:
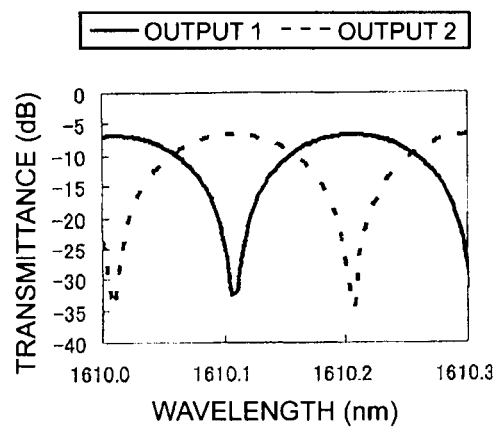
Figure 13A:
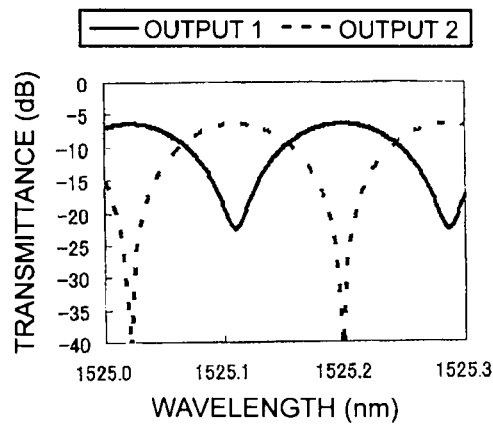
FIGS. 13A, 13B and 13C are diagrams for characteristics showing spectrum, in the vicinity of wavelength of 1525 nm, 1570 nm and 1610 nm respectively, of output ports 1 and 2 of a delay demodulation device with using a general directional coupler.
Figure 13B:
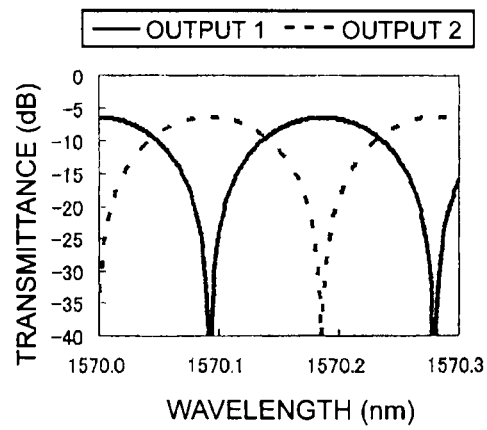
Figure 13C:
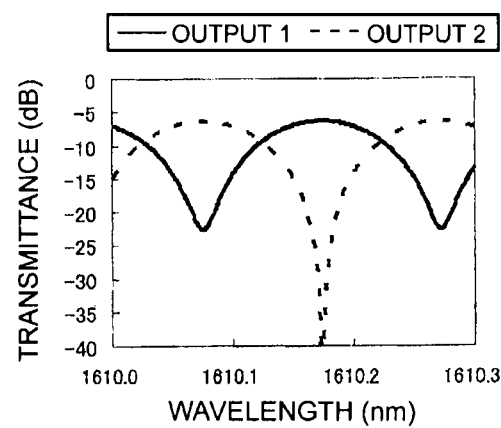

FIGS. 12A, 12B and 12C respectively show spectrum, in the vicinity of wavelength of 1525 nm, 1570 nm and 1610 nm, of output ports 1 and 2 (Pout 1 and Pout 2) of the delay demodulation device of the present exemplary embodiment with using the WINC above. As a comparison, FIGS. 13A, 13B and 13C respectively show spectrum, in the vicinity of wavelength of 1525 nm, 1570 nm and 1610 nm, of output ports 1 and 2 (Pout 1 and Pout 2) of a delay demodulation device with using a general directional coupler. As can be seen from FIGS. 13A, 13B and 13C, when the general directional coupler is used, the extinction ratio (the difference between the maximum value and the minimum value of transmittance) of the output 1 (through port of MZI 1) deteriorates massively as the wavelength becomes away from the value around 1570 nm in which the coupling ratio is about 50%. That is happened because generally the extinction ratio of the MZI circuit become maximum when the coupling ratio of the coupler is 50% and then the extinction ratio becomes deteriorated as the coupling ratio is away from the value of 50%. On the contrary, when the WINC shown in FIGS. 12A, 12B, 12C is used (in the case of the present exemplary embodiment), it is known that a high extinction ratio of 20 dB or more is obtained at any wavelength band.

It is noted that FIGS. 12A, 12B, 12C and FIGS. 13A, 13B, 13C show only outputs 1 and 2 (Pout 1 and Pout 2), however, similar extinction ratios are obtained with regard to outputs 3 and 4 (Pout 3 and Pout 4). Furthermore, a good characteristic, such as 0.2 GHz or less in entire C, L bands, is gained with regard to the polarization dependent frequency PDf and there is no deterioration caused by using the WINC. Furthermore, the insert loss is 6.7 dB or less in the entire C, L bands. The increase in loss, caused by using the WINC and expanding the evaluation wavelength band, is suppressed around 0.2 dB. As shown in the result above, it is confirmed that the wavelength band for use can be expanded by adapting the WINC as input couplers 6, 10 and output couplers 7, 11.

Besides, in each of the above embodiments, as a best example, the central portions of the first and second arm waveguides 8 and 9 of the first MZI 4 and the first and second arm waveguides 12 and 13 of the second MZI 5 are close to one another at regular intervals of 30 to 100 μm. However, the present invention is not limited to such a configuration, and is also applicable to a delay demodulation device configured such that the central portions of the two arm waveguides 8 and 9 and the central portions of the two arm waveguides 12 and 13 of the second Mach-Zehnder interferometer 5 are close to one another at irregular intervals.

In each of the above-described first and second embodiments, the optical path length L1 of the arm waveguide 9 is greater than the optical path length L2 of the arm waveguide 13, the first to fourth light output waveguides 21 to 24 have the same optical path length, and the length of the waveguide 15 is L1-L2 greater than that of the waveguide 14. However, the invention is not limited thereto. That is, in the first exemplary embodiment, the invention can be applied to a delay demodulation device in which the optical path length L1 of the arm waveguide 9 is greater than the optical path length L2 of the arm waveguide 13 and the sum of the optical path lengths of the waveguide 15 and the third and fourth light output waveguides 23 and 24 is L1-L2 greater than the sum of the optical path lengths of the waveguide 14 and the first and second light output waveguides 21 and 22.

In each of the above-described exemplary embodiments, the Y-branch waveguide is used as the optical splitter, but the invention is not limited thereto. Any coupler may be used as long as it can substantially equally divide input light. For example, various kinds of couplers, such as a directional coupler, a multi-mode interferometer coupler, and a wavelength-independent coupler using an MZI, may be used. Among them, it is preferable to use a coupler capable of obtaining the same branch ratio in a wide band.

In each of the above-described exemplary embodiments, as a preferred example, two wave plates, that is, the first wave plate 47 and the second wave plate 70 are inserted, but the invention is not limited thereto. Only the first wave plate 47 may be inserted according to, for example, the birefringence of the waveguide, the amount of polarization in the coupler, and the polarization efficiency of the wave plate. Alternatively, the first wave plate 47 may not be provided according to, for example, the birefringence of the waveguide, the amount of polarization in the coupler, and the polarization efficiency of the wave plate.

What is claimed is:

1. A Planar Lightwave Circuit (PLC)-type delay demodulation circuit comprising:
a planar lightwave circuit that is formed on one PLC chip and demodulates a Differential Quadrature Phase Shift Keying (DQPSK)-modulated optical signal,
wherein the planar lightwave circuit includes:
an optical splitter that branches the DQPSK-modulated optical signal into two optical signals; and
first and second Mach-Zehnder Interferometers (MZIs) that delay the branched optical signals by one bit so as to interfere with each other,
wherein a wave plate is provided in central portions of first and second arm waveguides of the first MZI and first and second arm waveguides of the second MZI in such a manner that the wave plate intersects all of the four arm waveguides, the four arm waveguides being close to one another in a portion where the wave plate is provided, and
in the planar lightwave circuit,
the arm waveguides of the first MZI and second MZI are placed to overlap each other in the same region,
the second arm waveguide of the first MZI and the first arm waveguide of the second MZI intersect each other at only two points, one of which is on one side of the wave plate and another of which is on another side of the wave plate,
the first arm waveguide of the first MZI and the second arm waveguide of the second MZI do not intersect with other arm waveguides, and
in the arrangement of the four arm waveguides in a portion where the wave plate is inserted, the first arm waveguide of the second MZI is placed between the two arm waveguides of the first MZI.

2. The PLC-type delay demodulation circuit according to claim 1, wherein
the optical path length of the shorter arm waveguide of the first MZI is the same as the optical path length of the shorter arm waveguide of the second MZI, and
the optical path length from the optical splitter through the shorter arm waveguide of the first MZI to an output end of the first MZI is the same as the optical path length from the optical splitter through the shorter arm waveguide of the second MZI to an output end on the second MZI side.

3. The PLC-type delay demodulation circuit according to claim 2, wherein
the planar lightwave circuit includes:
a light input waveguide to be connected to the optical splitter; and
four light output waveguides to be connected to an output coupler of the first MZI and an output coupler of the second MZI, respectively, and
the light input waveguide and the four light output waveguides are all provided on the same end surface of the PLC chip.

4. The PLC-type delay demodulation circuit according to claim 1, wherein
the optical path length L1 of the shorter arm waveguide of the first MZI is different from the optical path length L2 of the shorter arm waveguide of the second MZI, and
the optical path length from the optical splitter through the shorter arm waveguide of the first MZI to an output end of the first MZI is equal to the optical path length from the optical splitter through the shorter arm waveguide of the second MZI to an output end on the second MZI side.

5. The PLC-type delay demodulation circuit according to claim 1, wherein the four arm waveguides in the portion where the wave plate is inserted are placed in the following order: the first arm waveguide of the first MZI, the first arm waveguide of the second MZI, the second arm waveguide of the first MZI, the second arm waveguide of the second MZI.

6. The PLC-type delay demodulation circuit according to claim 5, wherein
the planar lightwave circuit includes:
two waveguides that are branched from the optical splitter and connected to input couplers of the first and second MZIs, respectively;
first and second light output waveguides that extend from an output coupler of the first MZI to the output ends thereof; and
third and fourth light output waveguides that extend from an output coupler of the second MZI to the output ends thereof,
the optical path length L1 of the shorter arm waveguide of the first MZI is greater than the optical path length L2 of the shorter arm waveguide of the second MZI, and
the sum of the optical path lengths of one of the two waveguides and the third and fourth light output waveguides is L1-L2 greater than the sum of the optical path lengths of the other one of the two waveguides and the first and second light output waveguides.

7. The PLC-type delay demodulation circuit according to claim 6, wherein
the one of the waveguides is L1-L2 longer than the other one of the waveguides, and
the optical path lengths of the first and second light output waveguides and the optical path lengths of the third and fourth light output waveguides are all equal.

8. The PLC-type delay demodulation circuit according to claim 6, wherein the one of the waveguides and the other one of the waveguides are each a U-shaped waveguide including a curved waveguide.

9. The PLC-type delay demodulation circuit according to claim 8, wherein the one of the waveguides is placed to extend outside the other one of the waveguides.

10. The PLC-type delay demodulation circuit according to claim 6, wherein
the input couplers and output couplers of the first and second MZIs are each a 3-dB coupler having two inputs and two outputs, and
the other one of the waveguides and the one of the waveguides are each connected to one of the two input ends of the respective input coupler on the same side.

11. The PLC-type delay demodulation circuit according to claim 6, wherein each of the input couplers and the output couplers of the first and second MZI is a Wavelength Insensitive Coupler.

12. The PLC-type delay demodulation circuit according to claim 1, wherein in the central portions of the two arm waveguides of the first MZI and the central portions of the two arm waveguides of the second MZI, a first half-wave plate whose main axis is inclined at an angle of 45° with respect to a refractive index main axis of the arm waveguides is inserted as the wave plate.

13. The PLC-type delay demodulation circuit according to claim 12, wherein at a position that deviates from the central portions of the two arm waveguides of the first MZI to an output side and a position that deviates from the central portions of the two arm waveguides of the second MZI to the output side, a second half-wave plate whose main axis is parallel or horizontal to the refractive index main axis of the arm waveguides is inserted.

14. An optical receiver comprising;
the PLC-type delay demodulation circuit according to claim 1 that receives a DQPSK modulated optical signal and then outputs four light intensity signals;
a balanced receiver that receives the four light intensity signals outputted from the PLC-type delay demodulation circuit and then converts the four light intensity signals into electric signals;
an electric circuit that receives and decodes the electric signals outputted from the balanced receiver.

15. The PLC-type delay demodulation circuit according to claim 1, wherein the four arm waveguides are provided with intervals and the intervals between the arm waveguides neighboring each other are 100 μm or less in a portion where the wave plate is provided.

* * * * *